Patented Feb. 21, 1950

2,498,200

UNITED STATES PATENT OFFICE 2,498,200

STABILIZED THIAMIN

Malcolm D. Bray, Noblesville, Ind., assignor to Eli Lilly and Company, Indianapolis, Ind., a corporation of Indiana No Drawing. Application August 27, 1948,
Serial No. 46,561

6 Claims. (Cl. 167—81)

This invention relates to the stabilization of vitamin solutions and to therapeutically useful stable aqueous solutions containing vitamin $B_1$.

The preparation of therapeutically useful aqueous solutions containing vitamin $B_1$, i. e. thiamin chloride and the like, which have an extended shelf life, which are capable of retaining their full potency and which will not develop an undesirable precipitate or color on standing, has long presented a problem. It is well known that initially colorless and clear aqueous solutions of thiamin, whether they contain thiamin alone or contain, in addition, other vitamins, develop a yellow to brown color and form a precipitate. These changes which represent the result of degradation of the thiamin have been found to be initiated or aggravated by many factors such as the presence of impurities, and exposure to heat and light and air. The disadvantage of such degradative changes, particularly when the thiamin is packaged and supplied to the trade, are obvious.

Attempts have been made to overcome the occurrence of these degradative changes. Thus it has been recommended that only thiamin of the purest form obtainable be used for the preparation of solutions for therapeutic application, and that during the preparation and packaging of the thiamin solution special efforts be taken to avoid the application of heat to the solution, contamination of the solution with any impurities and the exposure of the solution to air. These precautions, however, have been only partially successful and have left much to be desired in the provision of solutions of thiamin which will remain substantially colorless and free from any precipitate. Consequently, the loss in potency and the formation of a precipitate in the solutions, which have had no satisfactory explanation, remain as a continual hazard which the art would like to avoid.

An object of my invention is to provide therapeutic solutions comprising stable vitamin $B_1$-containing compositions which do not develop a color or form a precipitate even when stored under adverse conditions of light and heat. Another object is to provide solutions capable of being sterilized by heat without enhancing the tendency of the solution to form a color or precipitate. Other objects will become apparent from the following description of my invention.

In pursuance of the above and other objects, I have discovered that a stable, aqueous solution containing thiamin can be obtained by incorporating in said solution a relatively small amount of a stabilizing agent of the class consisting of thioglycerol, thiosorbitol and thioglucose. A solution containing vitamin $B_1$ and one or more of the stabilizers mentioned above is stable over long periods of time, can be stored under adverse conditions of heat and light, can be heat-sterilized, and does not require careful exclusion of air during the course of its preparation.

Effectively stabilized aqueous solutions of thiamin may be obtained by the incorporation of the stabilizing agent in the thiamin solution in a concentration of about 0.5 percent on a weight-volume basis. The practical absence of toxicity of the stabilizing agents employed for the purposes of my invention permits their use in much greater concentration than that specified above, for example, a concentration up to 5.0 per cent may be used. In general there is no particular advantage to be gained by the use of high concentrations. The effectiveness of the stabilizing agents is so great that I have found concentrations as low as 0.03 percent on a weight-volume basis to be fully effective in providing adequate stabilization of aqueous thiamin solutions containing about 0.1 percent thiamin on a weight-volume basis.

In preparing the compositions of my invention it is desirable to provide an aqueous solution containing the selected stabilizing agent in proper concentration, and to add the required amount of thiamin to this solution. By providing a solution in which the stabilizing agent is already present, the decomposition of the thiamin is inhibited from the moment of its solution.

The following examples of therapeutic compositions further illustrate my invention.

*Example 1*

A composition suitable for parenteral administration, comprising the following ingredients:

Thiamin hydrochloride _____ mg__ 10
Thioglycerol _____ mg__ 5
Water, q. s. _____ ml__ 1 is prepared by dissolving 5 g. of thioglycerol in about 950 ml. of water and adding 10 g. of thiamin. The volume of water is then brought up to 1000 ml. by the addition of about 50 ml. of water.

A solution thus prepared was placed in 20 ml. ampoules and heated at 125° C. in an autoclave for about two hours, and then exposed to strong ultraviolet light for about 30 hours. At the end of this time the solution remained substantially colorless and free from any precipitate. By way of comparison, a solution containing 10 mg. of thiamin per ml. of water, after subjection to the same adverse conditions, became brownish in color and contained a voluminous precipitate.

Example 2

A composition suitable for parenteral use is obtained by employing the following ingredients in the amounts shown below and dissolving them in the order in which they appear:

| | | |
|---|---|---|
| Water | l | 9 |
| Thiosorbitol | g | 50 |
| Thiamin hydrochloride | g | 40 |
| Nicotinamide | g | 750 |
| Riboflavin | g | 20 |
| Calcium pantothenate | g | 50 |
| Pyridoxin hydrochloride | g | 50 |
| Water, q. s. | l | 10 |

The composition thus obtained is stable over a long period of time and although initially somewhat yellowish because of the presence of riboflavin, it does not develop further color or a precipitate on long standing.

Example 3

A composition embodying several vitamins and suitable for oral administration is as follows:

| | | |
|---|---|---|
| Thiman chloride | g | 4.16 |
| Riboflavin | g | 2.78 |
| Nicotinamide | g | 20.80 |
| Pantothenic acid | g | 2.78 |
| Pyridoxin hydrochloride | g | 1.67 |
| Thioglucose | g | 100.0 |
| Coumarin | g | 0.5 |
| Vanillin | g | 1.0 |
| Glucose | kg | 1.2 |
| Sucrose | kg | 3.8 |
| Alcohol | cc | 500 |
| Water, q. s. | l | 10 |

Aqueous solutions of thiamin prepared for parenteral therapeutic application preferably are slightly acid in order to avoid the known degradation of thiamin which occurs in the presence of alkali. Thus it has been the practice to market therapeutic solutions having a pH between about pH 3 and about pH 4, this pH range representing a compromise between a higher pH which causes less pain on injection and a lower pH at which thiamin is more stable. The stabilized aqueous solutions of thiamin prepared in accordance with my invention are not limited to this range but are stable over a wide range. Thus, for example, I have found that even at pH 8 there is no formation of the undesirable precipitate which readily forms in unstabilized solutions at this pH. However, I prefer to prepare thiamin compositions having a pH in the range of 2.5 to about 5.

I claim:

1. A solution comprising water, thiamin, and in an amount effective to stabilize the thiamin, a member of the group consisting of thioglycerol, thiosorbitol and thioglucose.

2. A solution comprising water, a therapeutically effective amount of thiamin and, on a weight-volume basis, from about 0.05 to about 5.0 percent of a member of the group consisting of thioglycerol, thiosorbitol and thioglucose.

3. A therapeutic composition comprising a solution in an aqueous solvent of thiamin and, on a weight-volume basis, between 0.05 and 5.0 percent of a member of the group consisting of thioglycerol, thiosorbitol and thioglucose.

4. A composition according to claim 3 containing thioglucose.

5. A composition according to claim 3 containing thioglycerol.

6. A composition according to claim 3 containing thiosorbitol.

MALCOLM D. BRAY.

REFERENCES CITED

The following references are of record in the file of this patent:

UNITED STATES PATENTS

| Number | Name | Date |
|---|---|---|
| 2,047,144 | Kharasch | July 7, 1936 |
| 2,218,592 | Taylor | Oct. 22, 1940 |
| 2,442,461 | Karrer | June 1, 1948 |